INVENTORS
EDWARD A. YUCIS
JOHN H. COON

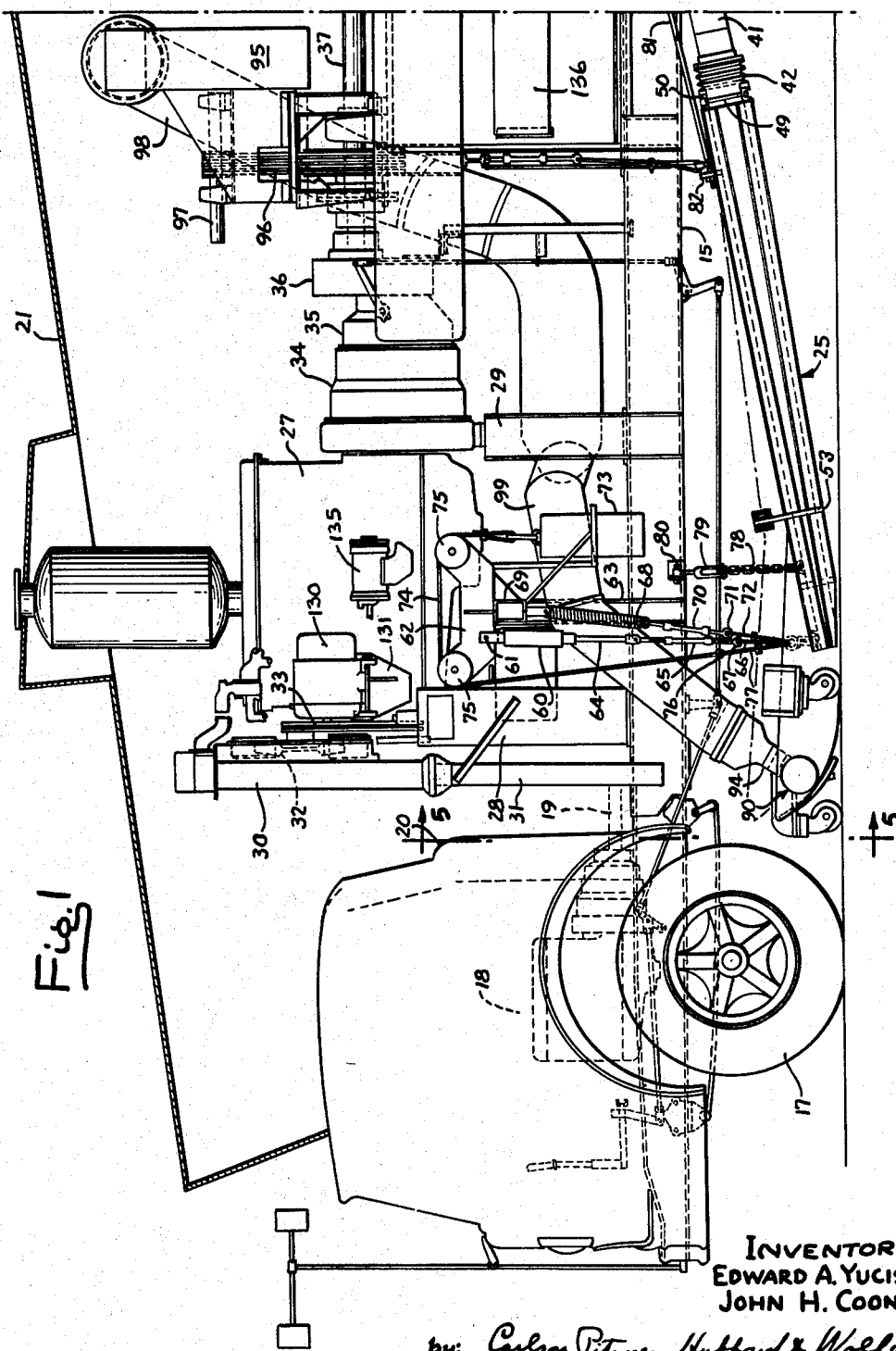

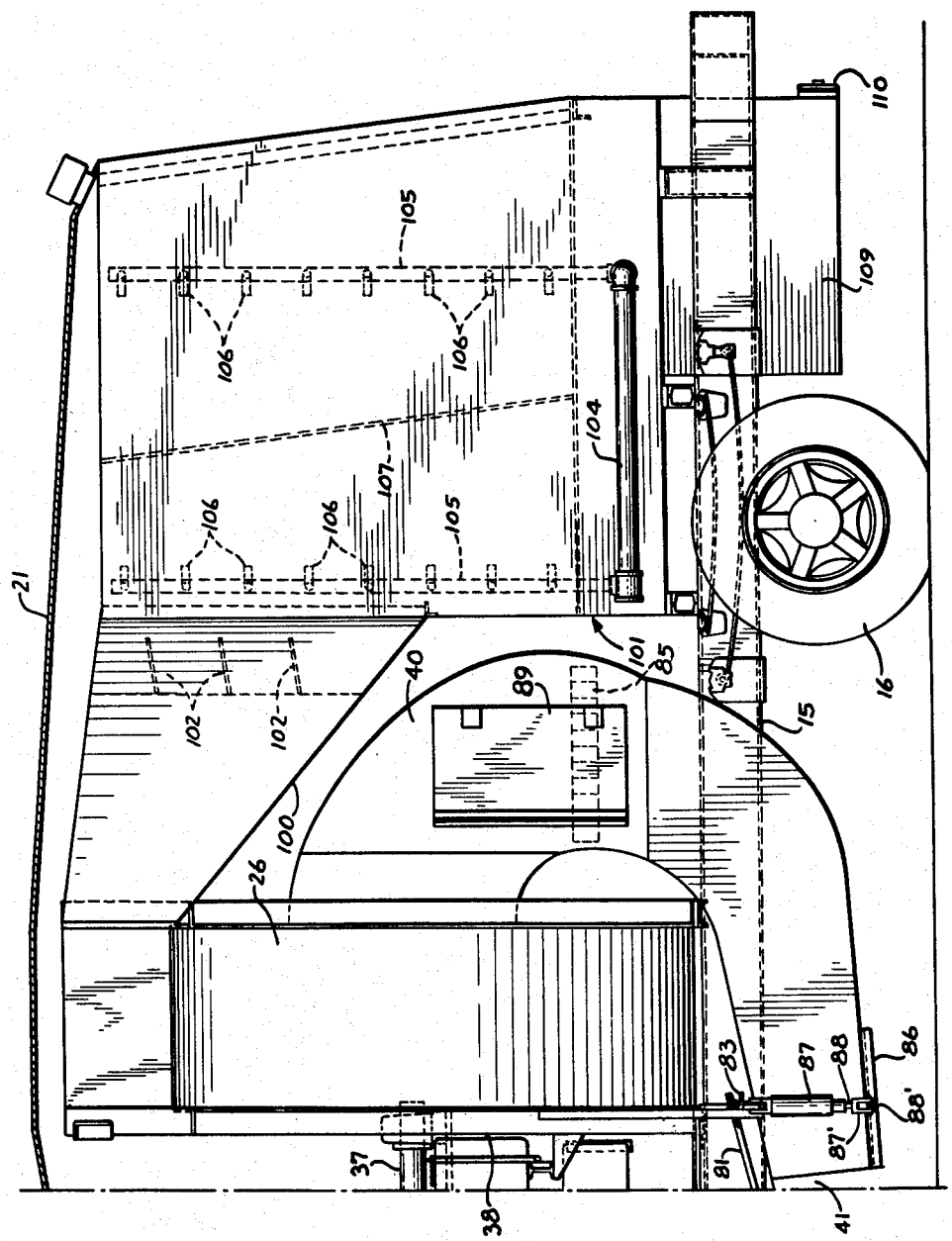

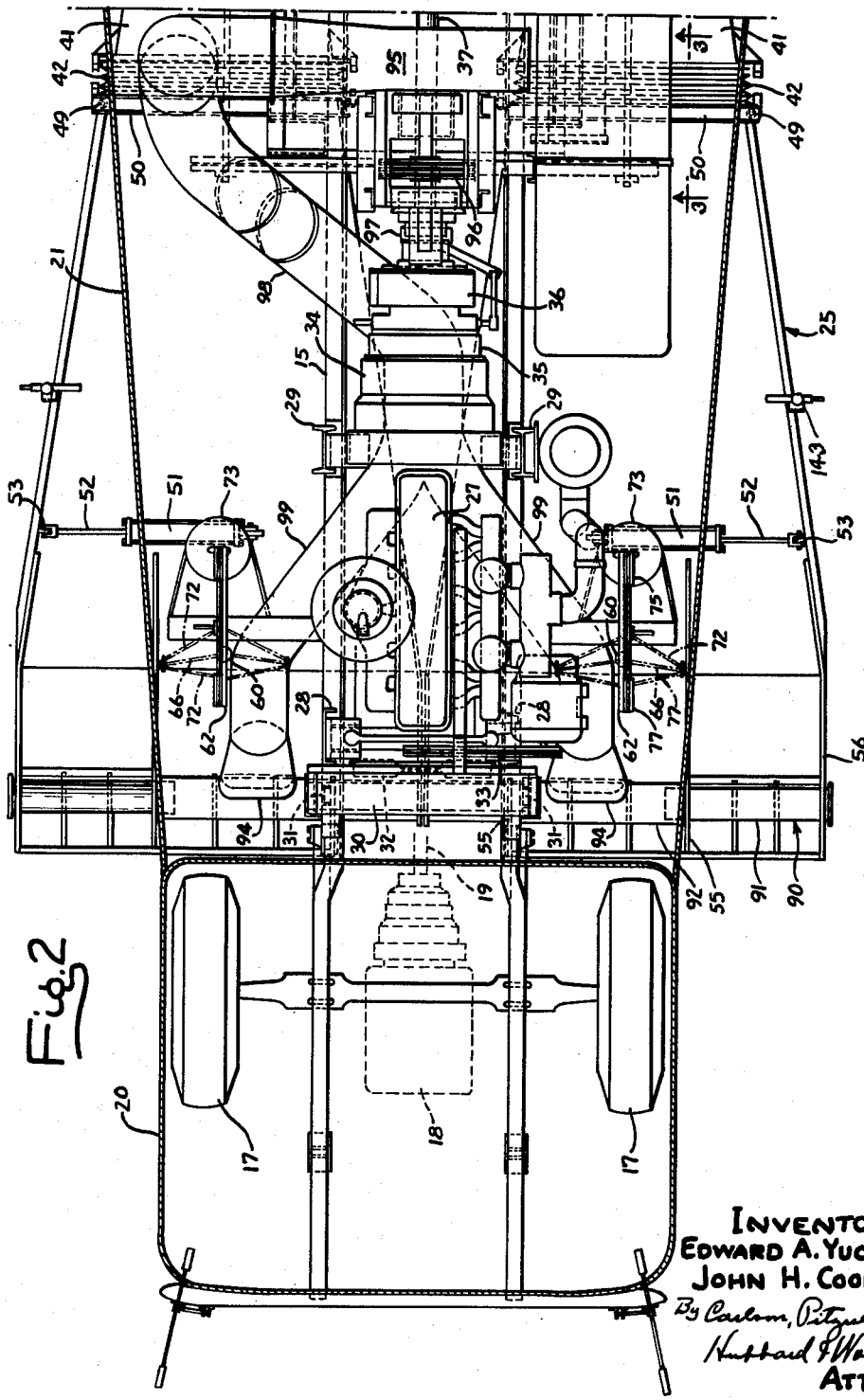

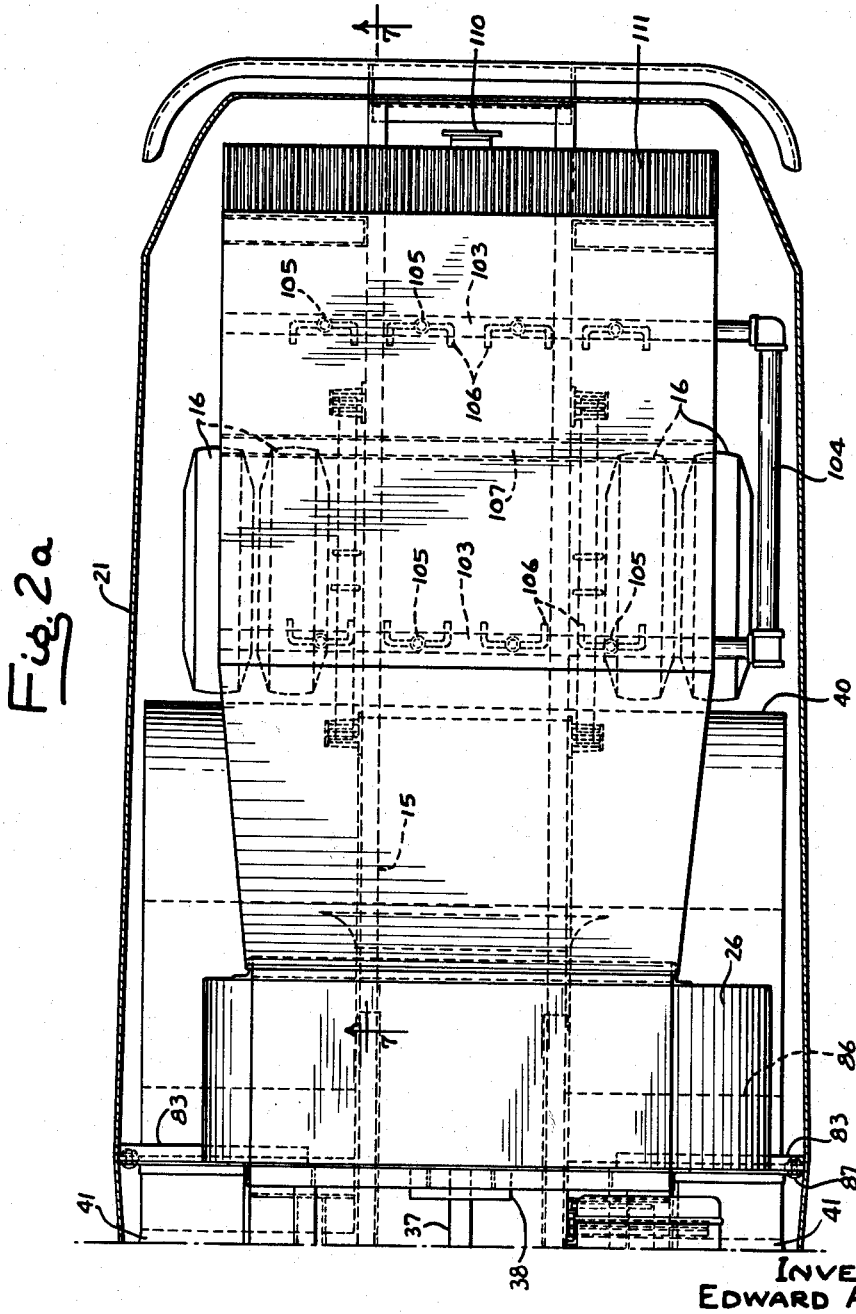

ATTYS

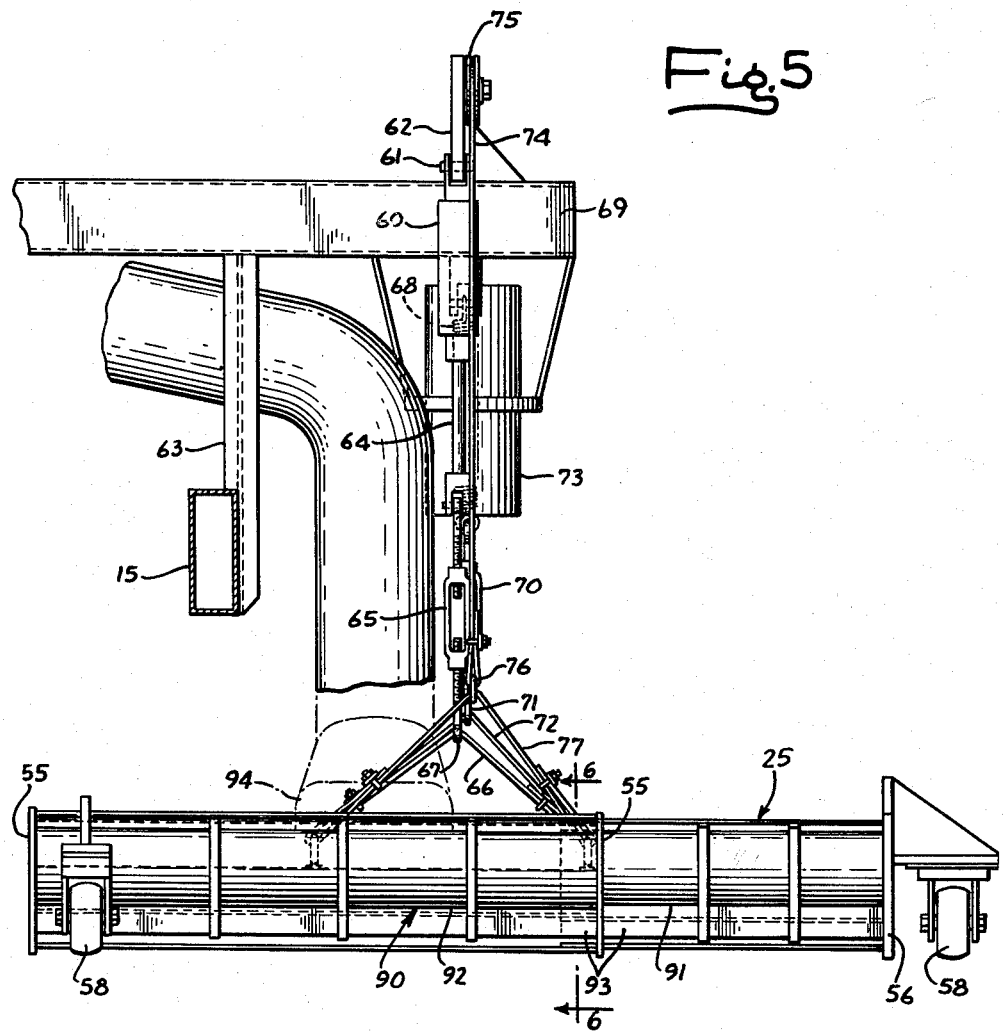
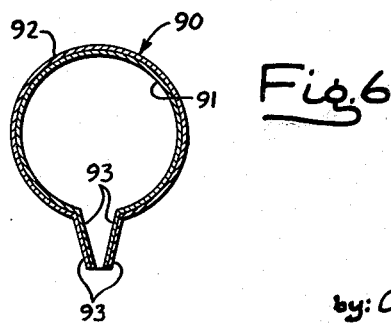

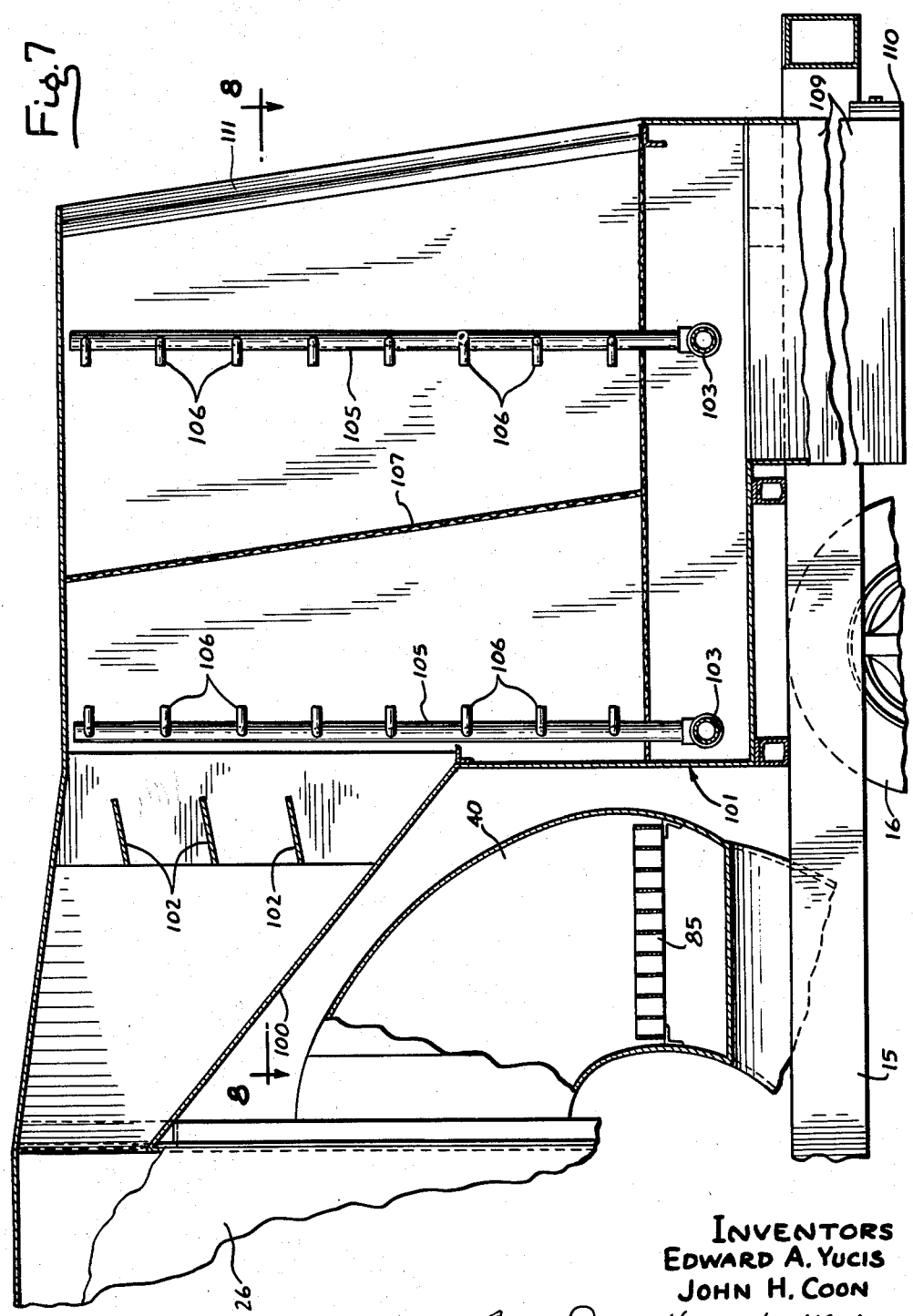

March 9, 1965  E. A. YUCIS ETAL  3,172,143
MACHINE FOR CLEANING LARGE SURFACE AREAS
Original Filed May 13, 1958  9 Sheets-Sheet 8

INVENTORS
EDWARD A. YUCIS
JOHN H. COON
by: Carlson, Pitzner, Hubbard & Wolfe
ATTYS.

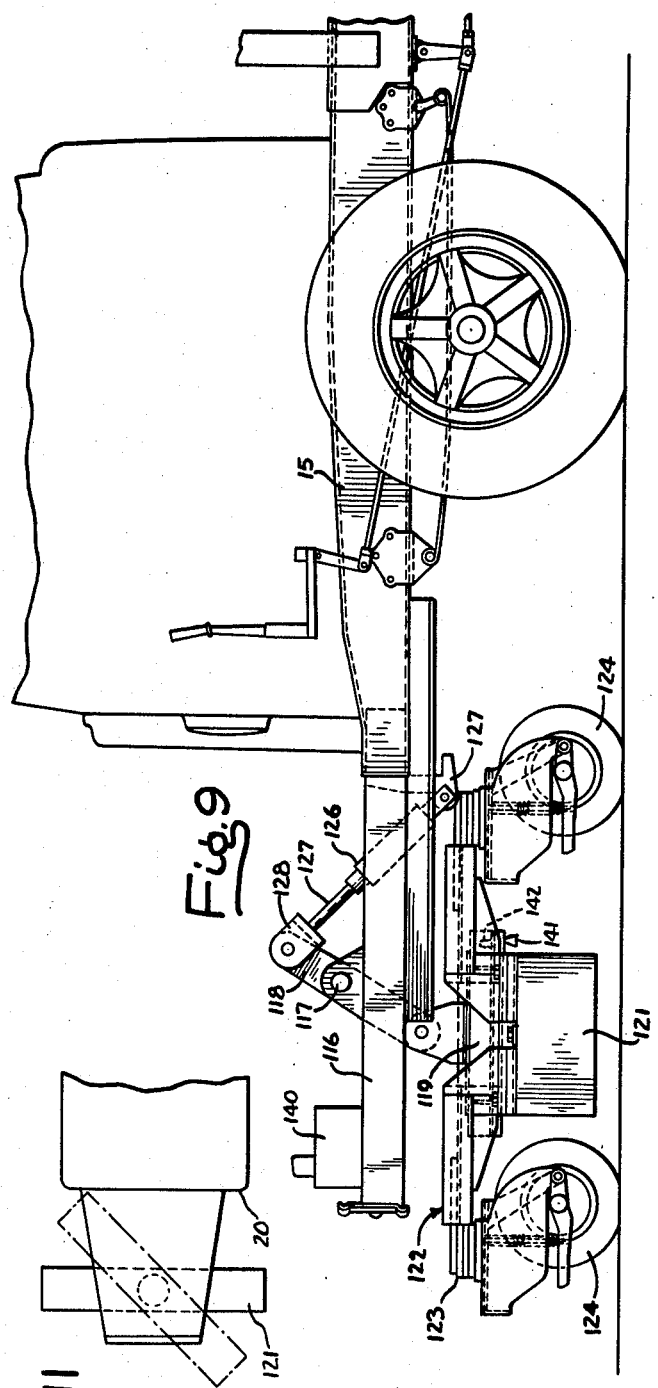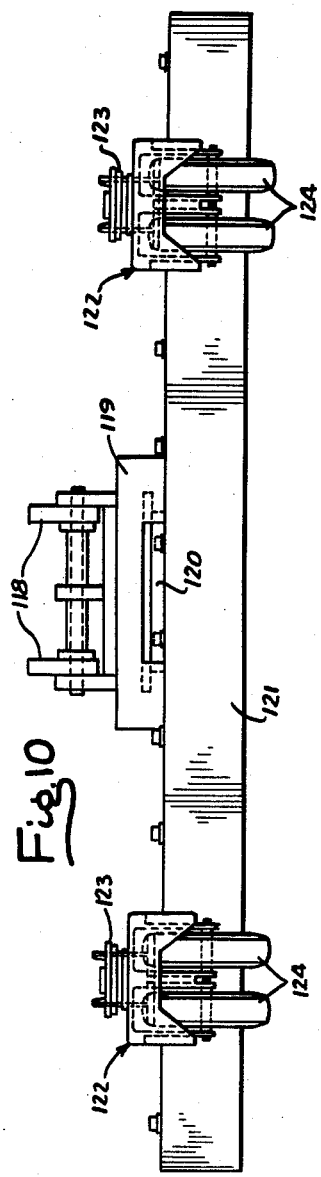

United States Patent Office 3,172,143
Patented Mar. 9, 1965

3,172,143
MACHINE FOR CLEANING LARGE SURFACE AREAS
Edward A. Yucis, Hinsdale, Ill. (8020–60 W. 47th St., Lyons, Ill.), and John H. Coon, Calumet Park, Ill.; said Coon assignor to said Yucis
Continuation of application Ser. No. 735,046, May 13, 1958. This application Oct. 29, 1962, Ser. No. 236,180
9 Claims. (Cl. 15—340)

This application is a continuation of application Serial No. 735,046, filed May 13, 1958, now abandoned.

The invention relates to the cleaning of large surface areas and, more particularly, to an improved self-propelled machine for effectively cleaning loose material from airport runways, roads, and similar extensive surfaces.

One object of the invention is to provide a machine of the above general character adapted to pick up all loose material over an area of substantial width while traveling at relatively high speed, thus enabling it to effectively clean large areas quickly and efficiently. An ancillary object is to provide a self-propelled machine of the type referred to which can be handled easily by a single operator, which is simple and rugged in construction and which requires a minimum of maintenance care.

Another object is to provide a suction-type surface cleaning machine with efficient and reliable means for loosening caked mud or other material stuck to the surface, thereby insuring complete removal of all extraneous material. A related object is to provide means for loosening caking mud or the like by means of a jet of compressed air.

Still another object is to provide a suction-type self-propelled surface cleaning machine having suction nozzles which can be expanded laterally to cover a swath substantially wider than the machine and which can be collapsed to approximately the width of the machine to permit the latter to be driven over public highways. An ancilliary object is to provide power actuated means for expanding and contracting the nozzles of the machine.

Other objects and advantages of the invention will become apparent from the following detailed description of the preferred embodiment illustrated in the accompanying drawings in which:

FIGURE 1 is a side view of the forward portion of a self-propelled surface cleaning machine embodying the invention, the external housing and other parts being broken away to show details of construction;

FIG. 1a is a side view of the rear portion of the machine shown in FIG. 1, the two figures when assembled end-to-end with FIG. 1a at the right illustrating the complete machine;

FIG. 2 is a top view of the forward portion of the machine shown in FIG. 1 with the outer housing removed;

FIG. 2a is a top view of the rear portion of the machine shown in FIG. 1 and when assembled with FIG. 2 illustrates the entire machine;

FIG. 5 is a fragmentary front view showing the structure for supporting and vertically adjusting one of the suction nozzles;

FIG. 6 is a transverse sectional view through the blower duct taken on a line 6—6 of FIG. 5;

FIG 7 is a vertical sectional view through the suction fan exhaust duct and scrubber taken in a plane substantially on the line 7—7 of FIG. 2a;

FIG. 9 is a side view of a magnetic pickup unit adapted to be attached to the forward end of the machine, the casing normally covering the unit being removed;

FIG. 10 is a front view of the magnetic pickup unit; and

FIG. 11 is a top view of the magnetic pickup unit showing the pickup magnet in operating and transport positions.

Figure 3:
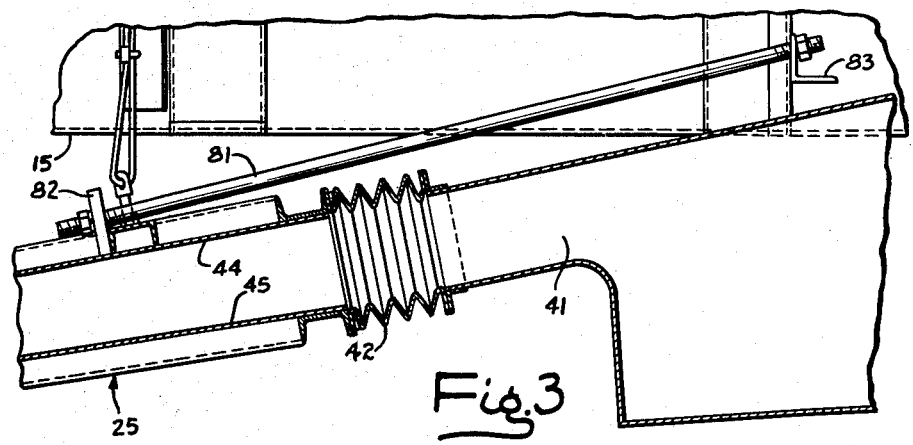
FIG. 3 is a fragmentary sectional view through the duct connection with one of the suction nozzles taken in a plane substantially on the line 3—3 of FIG. 2.

While a single preferred form of the invention has been shown and will be described in detail herein, it is to be understood that various modifications and adaptations may be made in the form, construction, and arrangement of the parts without departing from the spirit and scope of the invention as defined in the appended claims.

For purposes of illustration, the invention has been shown as embodied in a machine particularly well adapted for clearing loose material from airport runways. The machine, of course, can be used for cleaning roads, play areas and other large paved surfaces and, with suitable adjustments, it can be adapted to operate efficiently for removing extraneous material from bathing beaches and comparable areas of sand.

In the operation of modern airports, the presence of loose material on the runways presents a serious hazard to the operation of aircraft. Such material may include relatively large objects, such as tools dropped by mechanics, parts dropped by planes or vehicles using the runways, discarded soft drink bottles, and caked mud, as well as finer material, such as sand and dirt, blown onto the runways from unpaved areas of the airport. The larger objects, when picked up by a jet engine, may seriously damage or completely ruin the engine. Sand or smaller particles increase the wear on the moving parts of both jet and piston engines and, additionally, may cause skidding of planes landing or taking off.

In the preferred form shown by way of illustration, the improved surface cleaning machine comprises a self-propelled wheeled vehicle, such as a motor truck chassis having an elongated frame 15 supported by a pair of rear drive wheels 16 and a pair of dirigible front wheels 17. The vehicle is equipped with conventional automotive drive for the rear wheels including an engine and transmission 18 supported at the front end of the frame and connected with the usual rear axle differential by a drive shaft 19.

In the exemplary vehicle the engine is mounted under an operator's cab 20 which may be of the forwardly tilting type to provide access to the engine. The cab contains a seat for the operator and the usual controls for the vehicle including a conventional steering wheel and gear shifting means. For convenience of operation, the controls for the elements of the cleaning apparatus are also installed in the cab within easy reach of the driver.

The elements of the cleaning apparatus are supported on the frame 15 at the rear of the cab 20 and are enclosed in a housing 21 of sheet metal or other suitable material. The location of the cab at the front of the vehicle provides maximum visibility for the operator so that the machine can be effectively guided in successive trips or passes to cover the complete runway surface without unnecessary overlapping of adjacent swaths, thus enhancing its operating efficiency. Moreover, the machine may be driven safely at relatively high speeds both when performing a cleaning operation and over public highways.

As indicated heretofore, the improved machine is adapted to pick up loose material by suction and to this end is equipped with suction nozzles 25 having wide intakes positioned end-to-end transversely of the vehicle in closely spaced relation to the surface to be cleaned. The suction is generated by a suction fan 26 powered in this instance by an internal combustion engine 27. As will be seen by reference to FIG. 1, the engine 27 is supported in an elevated position by pedestals 28 and 29 at the rear of the cab 20. A cooling radiator 30 for the engine is supported on an upright bracket 31 in a position to receive a flow of air over the top of the cab induced by the usual fan 32 which, in this instance, is driven by V-belts 33 from the engine crankshaft. The engine is drivingly coupled to the impeller of the fan 26 through a fluid coupling 34, a clutch 35, a reducing gear box 36 and a drive shaft 37. The latter is journaled in suitable bearings carried on a frame structure 38 extending forwardly from the housing of the fan 26 and suitably mounted on the vehicle frame.

Secured to the fan housing and extending from the intake of the fan is a suction duct 40 which, as shown in FIG. 1a, extends rearwardly and downwardly and has its lower portion curved forwardly to extend below the frame 15 of the vehicle. As shown in FIG. 2, the lower portion of the duct flares laterally to substantially the width of the frame and opens forwardly through a pair of relatively long narrow necks 41 spaced apart laterally to afford clearance for the vehicle drive shaft and other operating elements of the machine.

The exemplary machine is equipped with two of the nozzles 25. The nozzles are alike, each comprising a hollow wedge-shaped sheet metal structure connected at its narrower rear end with the suction duct neck 41 by means of a flexible coupling 42. Each nozzle is made up of a pair of interfitting assemblies which, when telescoped together, has a lateral width corresponding approximately to one-half of the tread width of the vehicle. The assemblies may be extended laterally to a substantially greater width, thus enabling the nozzles to clear a swath substantially wider than the vehicle in each pass along the runways.

Figure 4A:
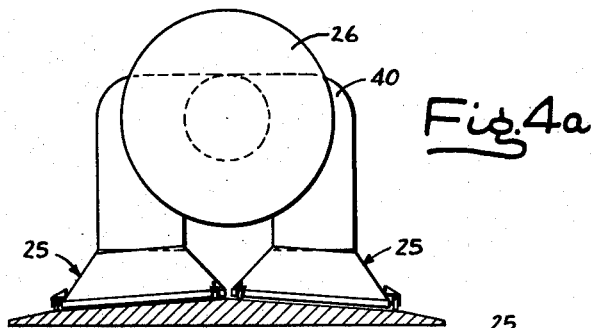
FIG. 4a is a diagrammatic view showing the manner in which the nozzles adjust to conform to surface contours.
Figure 4:
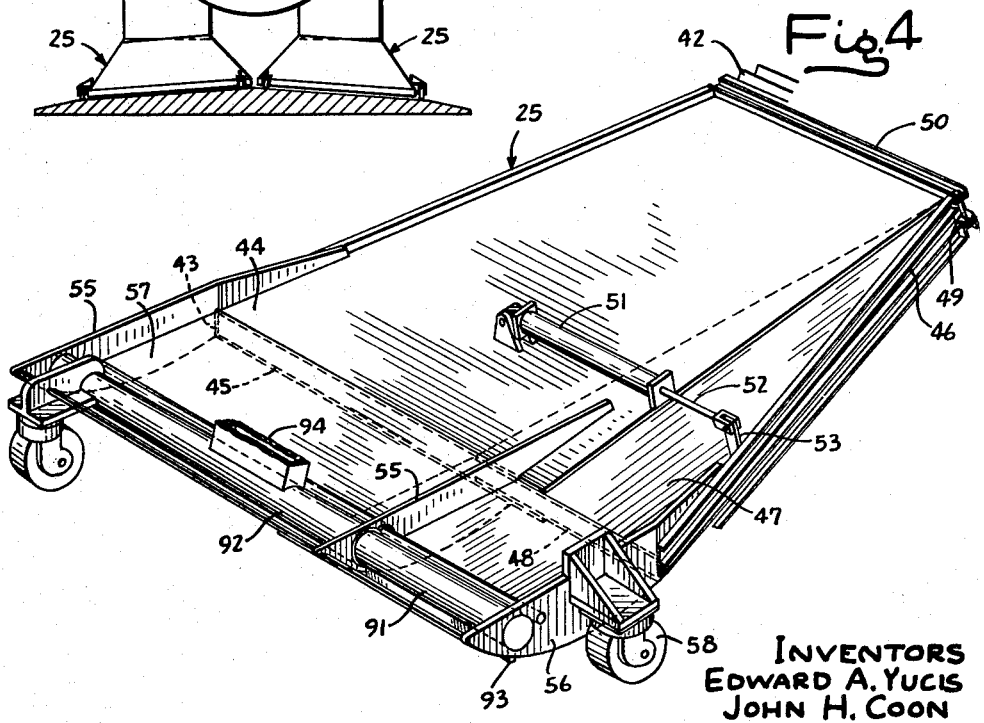
FIG. 4 is a fragmentary perspective view of the suction end of one of the nozzles showing the manner in which the lateral width of the nozzle is adjusted.

As shown in FIG. 4, the inner nozzle assembly comprises a sidewall member 43 and top and bottom wall members 44 and 45, the latter being in the form of sheet metal plates suitably reinforced by longitudinally extending bars. The companion assembly comprises a sidewall member 46 with top and bottom plates 47 and 48 adapted to slide between the plates 44 and 45. The sidewall member 46 is hinged to the first mentioned assembly as by a pin 49 located adjacent the coupling 42 with the suction duct. More specifically, the pin is pivoted in channel shaped cross members 50 welded or otherwise secured to the top and bottom plates 44 and 45, as shown in FIGS. 1 and 2.

The companion nozzle is similar to that above described with its outside wall adapted to swing outwardly and with its inner end substantially abutting the inner end of the first mentioned nozzle. When both nozzles are fully extended to the position shown in FIG. 2, the machine is operable to cover a relatively wide swath, that is, one substantially wider than the vehicle. With the nozzles contracted to the position shown in dotted lines, the overall width of the machine is reduced sufficiently to permit it to be driven over public highways.

To facilitate the extension and collapse of the nozzles, suitable power means is provided for shifting the hinged nozzle assemblies inwardly or outwardly as required. This means in its preferred form comprises for each of the nozzles a cylinder 51 suitably anchored at one end to the stationary assembly of the nozzle. A piston working in the cylinder is connected by a piston rod 52 with an upright bracket 53 welded or otherwise suitably attached to the outer wall 46 of the hinged assembly. Pressure fluid is supplied to enter the cylinder selectively from a suitable source and under control of valving (not shown) adapted to be controlled from the operator's cab.

Provision is made for supporting the intake ends of the nozzles 25 in a position to exert a maximum suction effect over a substantial area extending transversely of the vehicle. Thus, at each side of the stationary nozzle assembly there is provided a forwardly extending shoe 55 while a similar shoe 56 is provided at the outer side of the swinging nozzle assembly. These shoes are in the form of upright metal plates with their lower edges rounded off. A bar extending between the shoes 55 supports one edge of a cover plate 57 which extends rearwardly to overlie the end portion of the nozzle. The plates 57 in cooperation with the shoes thus define an open bottom, boxlike structure in communication with the intake of the nozzle so that the suction developed by the nozzle tends to urge the entire assembly downwardly against the surface being cleaned.

If desired, suitable rubber-tired wheels 58 are mounted on the shoes 55 and 56 to provide rolling support for the forward end of the nozzle structure. The wheels are preferably castered to enable them to follow properly on turns.

The flexible coupling of the nozzles 25 to the suction duct 40 permits the nozzles 25 to be swung between the operating position shown in full lines in FIG. 1 and a raised or transport position indicated in dotted lines, affording sufficient clearance for transport over public highways. Preferably power actuated means is provided for raising and lowering the nozzles. The power actuated means as shown comprises a hydraulic actuator of the cylinder and piston type having a cylinder 60 pivotally supported as at 61 on a bracket 62 supported on the frame 15 by an upright pillar 63. The cylinder 60 has a working piston connected by a piston rod 64 and adjustable rod 65 with the forward end of the nozzle. Such connection includes a cable 66 anchored at opposite ends to laterally spaced points on the nozzle and threading through an eye 67 at the end of the rod 65. This arrangement permits the nozzle to swivel or tilt laterally to follow variations in the surface contour. Thus, the nozzles are enabled to automatically take a position which conforms to the contour of a crowned road or the like. Pressure fluid is supplied to the cylinder 60 from a suitable source under control of valving (not shown) operated from the cab 20.

The substantial weight of the nozzle and its associated structure makes it desirable to provide counterbalancing means. Two separate counterbalances have been shown for this purpose, although either or both may be used if desired. Both are characterized by connections with the nozzle which permit lateral tilting of the nozzle to maintain proper operating relationship with the surface being cleaned. One counterbalance comprises a coiled tension spring 68 anchored at one end to the vehicle frame, in this instance, to a cross member 69 carried by the upright 63. The other end of the spring is attached to the nozzle by means of a rod 70 of adjustable length having an eye 71 at its lower end for the reception of a flexible member or cable 72 anchored at opposite ends to the nozzle structure at laterally spaced points. The sliding of the cable in the eye 71 permits the nozzle to tilt as required.

The second counterbalance comprises a weight 73 suspended from a flexible cable 74 running over spaced sheaves 75 carried on the bracket 62. The other end of the cable 74 is attached to a ring 76 adapted to receive a flexible member or cable 77 anchored at opposite ends to laterally spaced points on the nozzle 25. This connection likewise permits the nozzle to tilt laterally to accommodate its position to the surface contour.

The counterbalancing arrangement above described and the connection with the power lift mechanism provide a floating support for the forward end of the nozzle structure which enables it to rise and fall as well as tilt laterally to conform to changes in the surface contour over which it is traversed. The flexible coupling 40 affording connection with the suction duct accommodates this floating movement.

To avoid any possibility of damaging the nozzle structures through direct contact with the surface, suitable stop means is provided for limiting its downward movement. This stop means includes a flexible member such as a chain 78 anchored at one end to the forward end of the nozzle and at the other end to a shackle 79 pivotally secured as at 80 to the vehicle frame 15. An additional stop in the form of a rod 81 extends through an apertured cross member 82 adjacent the upper end of the nozzle structure and a cross member 83 secured to the vehicle frame 15. Stop nuts threaded on the ends of the rod determine the limit position of the nozzle. The location of the rod coupled with its loose reception in the apertured cross members eliminates interference with the tilting or swinging of the nozzles.

To prevent damage to the suction fan, means is provided in the suction duct 40 for intercepting any large objects picked up by the suction nozzles. This means conveniently comprises a grid 85 which may be made of flat steel bars disposed edgewise and arranged in crossing relation. The grid as shown is generally rectangular and is mounted in the depending portion of the duct immediately above the point where the duct bends forwardly. The forward portion thus defines a chip trap for accumulated material.

In the exemplary machine, the end portion of the duct constituting the chip trap is provided with a discharge opening normally closed by a hinged trap door 86. Power operated means is desirably provided for closing the door and maintaining it closed, such means being shown as a hydraulic actuator including a cylinder 87 suitably anchored to the frame 15 of the vehicle. A piston working in the cylinder has a piston rod 88 projecting from its lower end and pivotally connected by a yoke 87' and cross pin with a lug 88' provided on the edge of the door. An access door 89 is also provided in the side of the duct 40 to permit convenient access to the interior of the duct for clearing the grid of any material that may be stuck or adhere thereto.

To enable the machine to pick up caked mud and similar material that may be stuck to the runway, provision is made for effectively loosening such material ahead of the nozzles 25. For this purpose, each nozzle structure has a blower duct 90 positioned to direct a jet of compressed air downwardly against the surface of the runway as the machine travels forwardly. As shown in FIGS. 2 and 6, the blower duct 90 is constructed in two sections 91 and 92. Section 92 is supported by the shoes 55 provided on the stationary nozzle assembly. Section 91 is supported at one end on the outer shoe 56 of the hinged nozzle assembly and telescopes into the companion section when the nozzle is collapsed to its narrow transport position.

As shown in FIG. 6, each of the conduit sections 91 and 92 is formed with an elongated slot in its lower side positioned to direct a long, relatively narrow jet of air downwardly against the runway. Preferably, metal strips 93 welded to the sections on opposite sides of the slit define the jet directing nozzles. It will be understood that the strips for the two sections are spaced apart to permit the telescoping of the outer section 91 into the inner section 92.

The two duct sections 91 and 92 are closed at their outer ends by suitable headers and the latter section is formed with a laterally opening inlet 94 for connection with a source of air under pressure. In the exemplary machine, air under pressure is supplied by a blower 95 supported on the frame structure immediately ahead of the suction fan and above the shaft 37. While a separate engine may be provided for driving the blower if desired, in the present instance the drive is taken from the shaft 37 through a multiple V-belt drive 96 running over sheaves on the shafts 37 and the shaft 97 of the blower.

As shown in FIGS. 1 and 2, the outlet of the blower 25 is arranged to discharge through a flexible hose 98 having branches 99 connecting to the inlets 94 of the respective blower ducts.

Provision is made for effectively removing all entrained material from the air stream discharged from the suction fan so that the improved machine is substantially dust-free in operation. For this purpose, the outlet of the fan is connected by a flaring duct 100 with a scrubber 101 mounted adjacent the rear of the vehicle frame. The scrubber comprises a relatively large generally rectangular chamber defined by sheet metal walls and having its lower end closed to define a chamber for air washing water. The flaring inlet duct 100 permits substantial expansion of the air prior to its entry to the scrubber 101 and thus reduces the velocity and correspondingly decreases its ability to sustain or carry solid material. A baffle comprising a series of generally horizontal metal plates 102 extends across the outer end of the duct 100 to impart turbulence to the air entering the chamber.

Means is provided in the scrubbing chamber for directing a plurality of fine sprays of water through the circulating air to remove entrained material. For this purpose, two pipes 103 are arranged transversely of the chamber adjacent its lower end and are supplied with water under pressure from a pump (not shown) through a common supply pipe 104. Rising from each of the pipes 103 are a series of upright pipes 105, each closed at its upper end and carrying a series of double spray nozzles 106. The nozzles are positioned to direct sprays inwardly or toward the center of the chamber against a screen 107 extending transversely of the chamber between the two sets of nozzles. The combined action of the jets and screen effectively removes all material from the finest dust to the largest particles that pass the grid 85 from the air stream. Such material is trapped in the scrubber chamber and collected in the water in the reservoir at the bottom of the chamber. To facilitate collection and removal of such trapped material, the chamber is formed with a depending sump 109 having an outlet at its rear end closed by a removal cap 110.

Figure 8:
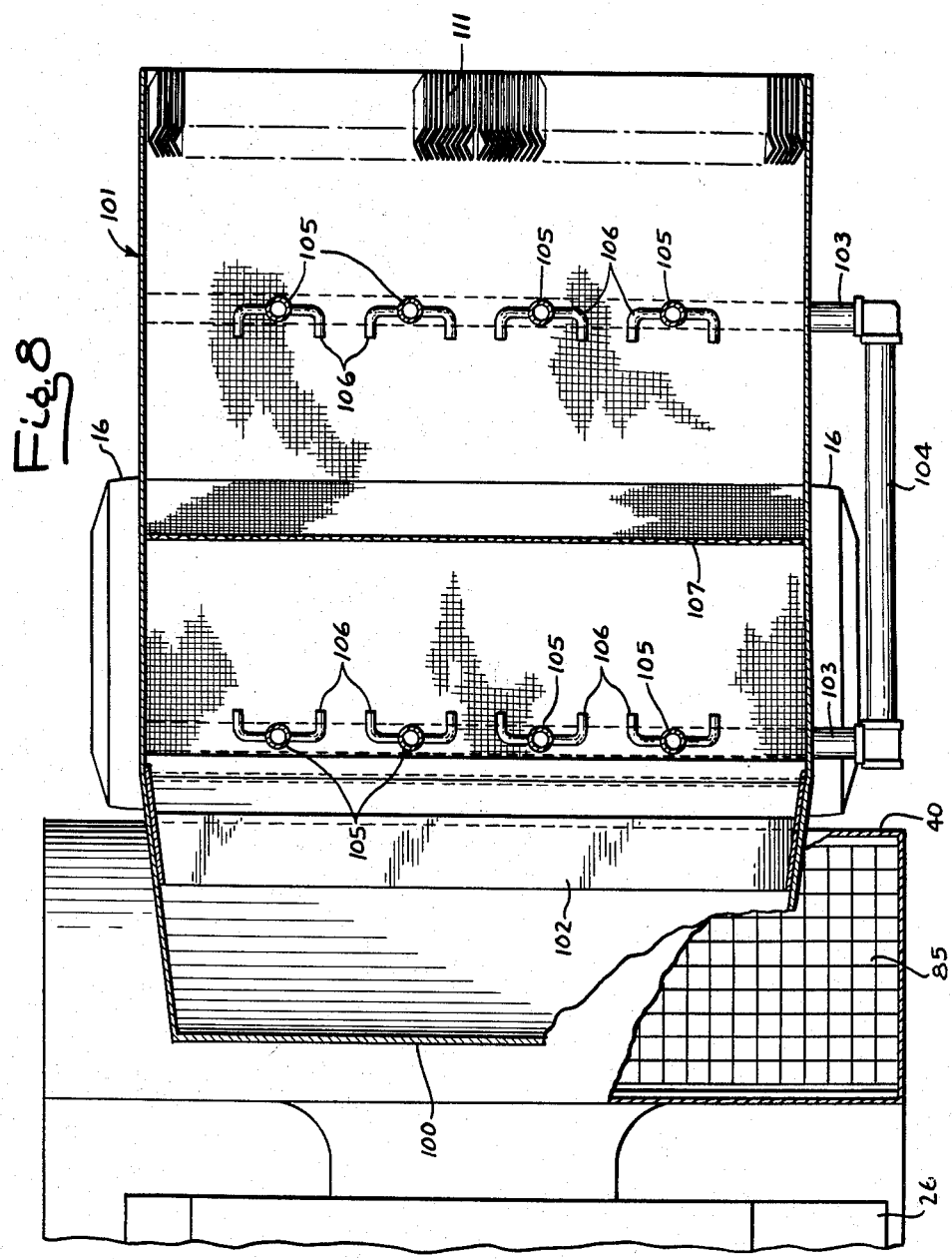
FIG. 8 is a horizontal sectional view through the air scrubber taken in a plane substantially on the line 8—8 of FIG. 7.

To reduce the velocity of the air leaving the scrubber chamber and to remove excessive moisture entrained therein, the chamber is provided at its rear or exhaust end with a baffle structure 111. As shown in FIG. 8, this structure comprises a series of angularly bent metal strips arranged in spaced parallel relation and extending generally vertically from the top to the bottom of the chamber opening. Preferably the strips are arranged in two oppositely facing groups disposed in facing relation at opposite sides of the exhaust opening to cause a convergence of the air streams issuing from the chamber. The angular configuration of the baffle strips abruptly changes the direction of the air stream and, through the contact therewith, serves to cause the air to drop excess moisture. Thus there is no wetting of the runway upon the passage of the machine.

It may be desirable in some instances to pick up metal objects as, for example, dropped tools before application of the suction action to the runway. The invention accordingly provides a novel magnetic pickup unit 115 (FIGS. 9–11) for this purpose. If the magnetic unit is to be employed, a frame structure comprising side members 116 connected by suitable cross members is bolted or otherwise rigidly connected to the vehicle frame 15 so as to project forwardly therefrom. Pivotally supported from the members 116 as by a cross shaft 117 are a pair of levers 118. At their lower ends, the levers carry a mounting block 119 having in its lower face a generally circular socket 120 supporting an electromagnet 121 for swiveling movement about a vertical axis.

The magnet 121 preferably has a length corresponding to the extended width of the suction nozzles so as to cover an equivalent swath as the machine traverses a path along a runway. The swiveling action afforded by the mounting permits the magnet to be turned to the retracted position shown in broken lines in FIG. 11, thus reducing the overall width to the degree required for traveling public highways.

In view of its weight the magnet 121 is desirably supported by wheeled trucks 122 at each end. Each such truck includes a frame member 123 adapted to be bolted or otherwise suitably attached to the magnet and is provided at opposite ends by rubber-tired caster wheels 124. The caster wheels are preferably spring mounted to absorb road shocks and by reason of their castering mounting facilitate the swinging of the magnet to angled position for transport.

Suitable power actuated means is provided for lifting the entire magnet assembly when the machine is to be moved over public highways. As shown in FIG. 9, this means includes a cylinder 126 anchored at one end to a bracket 127 connected between the side members 116. The cylinder has a working piston connected by a piston rod 127 and yoke 128 with the ends of the levers 118 remote from the magnet. Pressure fluid is supplied to this actuator from the common source on the machine through valving operated from the control cab.

Current is supplied to the magnet 121 by a generator 130 (FIG. 1) herein shown as mounted on a bracket 131 on the side of the suction fan driving engine 27. The generator in this case is driven by the same V-belt 33 that drives the cooling fan of the engine. It will be appreciated that a separate motor driven generator may be employed if desired.

Pressure fluid for operating the various hydraulic actuators employed in the improved cleaning machine may be supplied from any suitable source. The exemplary machine includes a pump 135 adapted to be driven from the engine 27 in any suitable manner. The pump in this instance draws fluid from a reservoir 136 carried on the frame 15 forwardly of the suction fan and spent pressure fluid is returned to this reservoir after use.

To facilitate the proper cleaning of an airport runway, suitable means is provided on the machine for marking the boundaries of the swath covered in each pass of the machine. This marking means may comprise a tank 140 for marking fluid, which may be conveniently mounted on the forward end of the magnet supporting frame. Conduits from this tank lead to suitably shaped marking nozzles 141 at opposite ends of the magnet, the flow of fluid being controlled by solenoid operated valves 142 controlled from the operator's cab. When the magnetic pickup unit is not employed, marking nozzles 141 may be mounted on the swinging nozzle assemblies and supplied with marking liquid under control of valves operated from a tank mounted on the vehicle frame. As the nozzles are mounted on the swinging assemblies of the suction nozzles, they are automatically adjusted to mark the swath covered in each pass of the machine.

Machines constructed in accordance with the present invention have been found to operate very satisfactorily with a suction fan having a rate of capacity from 60,000 to 66,000 cubic feet per minute. A companion blower having a rated capacity of from 7,400 to 8,000 cubic feet per minute was found to be adequate for supplying the blower jets. The suction fan and blower in this instance were driven by a common internal combustion of engine of 385 H.P.

Suction nozzles having a maximum expanded width of 12 feet and a minimum width of 8 feet were found to be efficient and reliable in operation. A machine so constructed was found to be capable of thoroughly cleaning airport runways at the rate of 1,800,000 square feet per hour. As all of the controls for the cleaning apparatus, as well as the vehicle controls, are centered in the operator's cab, a single operator is able to operate the machine safely and efficiently. The magnetic pickup unit used with the above machine was powered by a 5 kw. generator driven by the suction fan engine. It was found to be capable of picking up objects of magnetic material of any size likely to be found on an airport runway or other surface traveled by vehicles.

While the improved machine is intended promarily for cleaning paved surfaces, it may also be used to advantage for cleaning bathing beaches and comparable sand areas. To provide the required traction when so used, low pressure auxiliary tires may be mounted on the conventional high pressure tires in known manner.

To adapt the machine for such use, the scrubber is temporarily rendered inactive. More specifically, water is drained from the scrubber tank and the water pump is shut off. As the machine is driven along a stretch of beach, the suction nozzles pick up the top layer of sand and the extraneous material mixed with it. Any large objects so picked up are intercepted by the grid 85 and collected in a chip trap of the suction duct. Smaller objects that pass through the grid are intercepted by the screen 107 and collected in the scrubber chamber from which they can be removed at the end of a cleaning operation. The cleaned sand is blown through the scrubber outlet with the baffles 111 reducing the velocity of the stream so that the discharged sand is deposited close behind the machine.

It will be apparent from the foregoing that the invention provides a machine of novel and advantageous construction for cleaning large surface areas. The machine is self-propelled and is constructed and arranged so that it can be safely and efficiently handled by a single operator. Its extensible and collapsible suction nozzle arrangement enables it to clean a wide swath of surface in each pass and yet enables the machine to be easily conditioned for driving over public highways. Loose material picked up by the machine from the finest dust to the heaviest objects is effectively trapped in the machine, thus affording dust-free operation. The machine is relatively simple and very sturdy in construction and capable of efficient operation with a minimum of maintenance work. The invention also provides a novel magnetic pickup unit for use with the machine. The unit is characterized by the novel mounting of the magnet which permits it to be raised and lowered between transport and operating positions. Additionally, the magnet may be swung about a vertical axis between a transverse operating position and an angled transport position in which the overall width is reduced sufficiently to permit the machine to travel public highways.

We claim as our invention:

1. In a machine for clearing large surface areas of loose material accumulated thereon, in combination, a power driven blower, a power driven suction fan, a suction nozzle comprising interfitting assemblies, each including top and bottom wall members and a side member, said assemblies being interconnected to permit adjustment of the effective width of the intake opening defined thereby, a blower duct supported adjacent said nozzle structure having an elongated outlet portion to direct a jet of air against the surface to be cleaned, said duct including telescoping sections connected to and movable with the respective assemblies to conform to the varying widths of the nozzle intake opening, means connecting said suction nozzle to the intake of said fan, and means connecting said duct to the outlet of said blower.

2. In a machine for clearing large surface areas of loose material accumulated thereon, in combination, a power driven blower, a power driven suction fan, a suction nozzle comprising interfitting assemblies, each having top and bottom wall members and a side member, said assemblies being interconnected adjacent one end of the nozzle structure to permit adjustment of the effective width of the intake opening at the other end of the nozzle structure, a blower duct supported adjacent said other end of the nozzle structure and having an elongated outlet portion to direct a jet of air against the surface to be cleaned, said duct including telescoping sections connected to and movable with the respective assemblies to conform to the varying widths of the nozzle intake opening, means connecting said nozzle and said duct respectively to said fan and said blower, and an actuator connected to said assemblies for adjusting the effective width of the nozzle structure and the duct.

3. A machine for removing loose materials from large surface areas, comprising, in combination, a vehicle adapted to travel over the surface to be cleaned, a suction nozzle supported on said vehicle defining an inlet disposed closely adjacent said surface, said nozzle being adjustable laterally to change the width of said inlet thereof, a blower duct supported in a position to direct a jet of compressed air against said surface ahead of said nozzle, said duct being adjustable simultaneously with said nozzle to vary the area over which the jet is directed, and means for raising and lowering said nozzles and said ducts relative to said surface.

4. In a machine for clearing airport runways and the like of loose material, in combination, a power driven suction fan, a suction nozzle comprising, top, bottom and sidewall members defining an elongated hollow structure open at both ends, means connecting one end of said structure to the intake of said fan, said top and bottom wall members each comprising overlapping metal plates secured to the respective sidewall members, one of said sidewall members being pivoted adjacent said one end of the structure to swing toward and from the other sidewall member for varying the effective width of the other end of the nozzle structure.

5. In a machine for clearing airport runways and the like of loose material, in combination, a power driven suction fan, a suction nozzle comprising top, bottom and sidewall members defining an elongated hollow structure open at both ends, means connecting one end of said structure to the intake of said fan, said top and bottom wall members each comprising overlapping metal plates secured to the respective sidewall members, means pivotally supporting one of said sidewall members and the attached top and bottom plates to swing toward and from the other sidewall member about an axis located adjacent said one end of the nozzle structure, and a power operated actuator for variably positioning said one sidewall member and attached plates.

6. In a machine for clearing airport runways and the like of loose material, in combination, a power driven blower, a power driven suction fan, a suction nozzle comprising interfitting assemblies each including top and bottom wall members and a side member, said assemblies being pivotally interconnected adjacent one end of the nozzle structure to permit adjustment of the effective width of the intake opening at the other end of the nozzle structure, a blower duct supported adjacent said other end of the nozzle structure and having an elongated outlet positioned to direct a jet of air against the surface to be cleaned, said duct including telescoping sections connected to and movable with the respective assemblies to conform to the varying widths of the nozzle intake opening, means connecting said suction nozzle to the intake of said fan, and means connecting said duct to the outlet of said blower.

7. In a machine for clearing airport runways and the like of loose material, in combination, a power driven blower, a power driven suction fan, a suction nozzle comprising interfitting assemblies each including top and bottom wall members and a side member, said assemblies being pivotally interconnected adjacent one end of the nozzle structure to permit adjustment of the effective width of the intake opening at the other end of the nozzle structure, a blower duct supported adjacent said other end of the nozzle structure and having an elongated outlet positioned to direct a jet of air against the surface to be cleaned, said duct including telescoping sections connected to and movable with the respective assemblies to conform to the varying widths of the nozzle intake openings, means connecting said nozzle and said duct respectively to said fan and said blower, and a pressure fluid operated actuator connected to swing said assemblies for adjusting the effective width of the nozzle structure and the duct.

8. A machine for removing loose material from large paved surfaces, comprising, in combination, a self-propelled vehicle adapted to travel over the surface to be cleaned, a pair of suction nozzles supported in side-by-side relation on said vehicle with their inlets disposed closely adjacent said surface, said nozzles being adjustable laterally to vary the effective widths of their inlets, a pair of blower ducts supported in a position to direct jets of compressed air against said surface ahead of said nozzles, said ducts being adjustable simultaneously with said nozzles to vary the area over which the jets are directed, a power driven suction fan connected to said nozzles, and a power driven blower connected to said ducts.

9. A machine for removing loose material from large surfaces, comprising, in combination, a self-propelled vehicle adapted to travel over the surface to be cleaned, a pair of suction nozzles supported in side-by-side relation on said vehicle with their inlets disposed closely adjacent said surface, said nozzles being adjustable laterally to vary the effective widths of their inlets, a pair of blower ducts supported in a position to direct jets of compressed air against said surface ahead of said nozzles, said ducts being adjustable simultaneously with said nozzles to vary the area over which the jets are directed, and power operated means for raising and lowering said nozzles and ducts relative to said surface.

References Cited by the Examiner

UNITED STATES PATENTS

| | | | |
|---|---|---|---|
| 564,013 | 7/96 | Furnas | 15—353 |
| 750,852 | 2/04 | Hart | 15—354 |
| 1,081,209 | 12/13 | Carr | 15—347 |
| 1,168,175 | 1/16 | Deardorff | 15—353 |
| 1,186,079 | 6/16 | Cooley | 15—414 X |
| 1,187,209 | 6/16 | Warner | 15—346 |
| 1,369,118 | 2/21 | McDougall et al. | 15—353 X |
| 1,461,173 | 7/23 | Bennett | 15—353 |
| 1,577,070 | 3/26 | Orr | 15—352 |
| 1,615,348 | 1/27 | Schroeder | 15—415 |
| 1,691,263 | 11/28 | Alvarado | 15—4 |
| 1,701,996 | 2/29 | Dansby | 15—300 |
| 1,704,043 | 3/29 | Green | 15—346 |
| 2,193,784 | 3/40 | Smith | 15—340 |
| 2,233,167 | 2/41 | Holm-Hansen | 15—353 |
| 2,419,353 | 4/47 | Henley | 15—354 X |
| 2,635,277 | 4/53 | Belknap | 15—353 X |
| 2,653,278 | 4/53 | Belknap | 15—353 |

FOREIGN PATENTS 362,070    9/21    Germany.

WALTER A. SCHEEL, *Primary Examiner.*

CHARLES A. WILLMUTH, *Examiner.*